(12) United States Patent
Miyagawa et al.

(10) Patent No.: US 12,370,470 B2
(45) Date of Patent: *Jul. 29, 2025

(54) RESERVE TANK

(71) Applicant: DENSO CORPORATION, Kariya (JP)

(72) Inventors: Masashi Miyagawa, Kariya (JP); Osamu Hakamata, Kariya (JP); Akira Yamanaka, Kariya (JP); Kenshirou Matsui, Kariya (JP); Masaki Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 330 days.

This patent is subject to a terminal disclaimer.

(21) Appl. No.: 17/963,742

(22) Filed: Oct. 11, 2022

(65) Prior Publication Data

US 2023/0035792 A1 Feb. 2, 2023

Related U.S. Application Data

(63) Continuation of application No. PCT/JP2021/008124, filed on Mar. 3, 2021.

(30) Foreign Application Priority Data

Apr. 15, 2020 (JP) .................................. 2020-072839
Nov. 24, 2020 (JP) .................................. 2020-194252

(51) Int. Cl.
*B04C 5/02* (2006.01)
*B01D 19/00* (2006.01)
(Continued)

(52) U.S. Cl.
CPC ............ *B01D 19/0057* (2013.01); *B04C 5/02* (2013.01); *B04C 5/081* (2013.01); *B04C 5/103* (2013.01); *F01P 3/20* (2013.01); *F01P 11/00* (2013.01)

(58) Field of Classification Search
CPC ....... B01D 19/0057; B04C 5/02; B04C 5/081; B04C 5/103; F01P 3/20; F01P 11/00; F01P 11/028

See application file for complete search history.

(56) References Cited

U.S. PATENT DOCUMENTS

2016/0129457 A1* 5/2016 Valentina .................. B04C 5/18
                                                          210/512.1
2021/0001354 A1* 1/2021 Sakata ................... F01P 11/028
(Continued)

FOREIGN PATENT DOCUMENTS

JP          2002250230 A          9/2002
JP          2005248753 A          9/2005
(Continued)

*Primary Examiner* — Dung H Bui
(74) *Attorney, Agent, or Firm* — Harness, Dickey & Pierce, P.L.C.

(57) ABSTRACT

A reserve tank includes a gas-liquid separator, a flow inlet portion, a flow outlet portion, and a projection shaped in a tubular form. The gas-liquid separator is shaped in a bottomed tubular form and is centered on a predetermined axis. The flow inlet portion is configured to conduct coolant into an inside of the gas-liquid separator. The flow outlet portion is configured to discharge the coolant from the inside of the gas-liquid separator. The projection extends along the predetermined axis from a bottom wall at the inside of the gas-liquid separator. An inner space of the projection opens to an inner space of the gas-liquid separator at a distal end portion of the projection.

9 Claims, 9 Drawing Sheets

(51) Int. Cl.
    *B04C 5/081*     (2006.01)
    *B04C 5/103*     (2006.01)
    *F01P 3/20*     (2006.01)
    *F01P 11/00*     (2006.01)

(56) References Cited

U.S. PATENT DOCUMENTS

2022/0063373 A1* 3/2022 Grouillet ................ F01P 11/029
2022/0065157 A1* 3/2022 Miyagawa ............. F01P 11/028
2022/0099017 A1* 3/2022 Sakata .................... F01P 11/04

FOREIGN PATENT DOCUMENTS

| JP | 2015028336 A | 2/2015 |
|----|--------------|--------|
| JP | 2020023965 A | 2/2020 |

* cited by examiner

RESERVE TANK

CROSS REFERENCE TO RELATED APPLICATIONS

This application is a continuation application of International Patent Application No. PCT/JP2021/008124 filed on Mar. 3, 2021, which designated the U.S. and claims the benefit of priority from Japanese Patent Application No. 2020-072839 filed on Apr. 15, 2020 and Japanese Patent Application No. 2020-194252 filed on Nov. 24, 2020. The entire disclosures of all of the above applications are incorporated herein by reference.

TECHNICAL FIELD

The present disclosure relates to a reserve tank.

BACKGROUND

A vehicle has a cooling system that is configured to cool each of corresponding components of the vehicle by circulating coolant. The components to be cooled by the cooling system include auxiliary devices, such as an engine and an intercooler. In addition to these devices to be cooled, a water pump, which pumps the coolant, a reserve tank, which stores a portion of the coolant, and the like are provided in a path, through which the coolant is circulated in the cooling system. When the amount of coolant is decreased for some reason, the coolant is replenished from the reserve tank. As a result, it is possible to limit a deterioration in the cooling performance caused by the decrease in the amount of coolant.

SUMMARY

This section provides a general summary of the disclosure, and is not a comprehensive disclosure of its full scope or all of its features.

According to the present disclosure, there is provided a reserve tank including:
- a gas-liquid separator that is shaped in a bottomed tubular form and is centered on a predetermined axis;
- a flow inlet portion that is formed at the gas-liquid separator and is configured to conduct coolant into an inside of the gas-liquid separator;
- a flow outlet portion that is formed at the gas-liquid separator and is configured to discharge the coolant from the inside of the gas-liquid separator; and
- a projection that is shaped in a tubular form and extends along the predetermined axis from a bottom wall at the inside of the gas-liquid separator.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
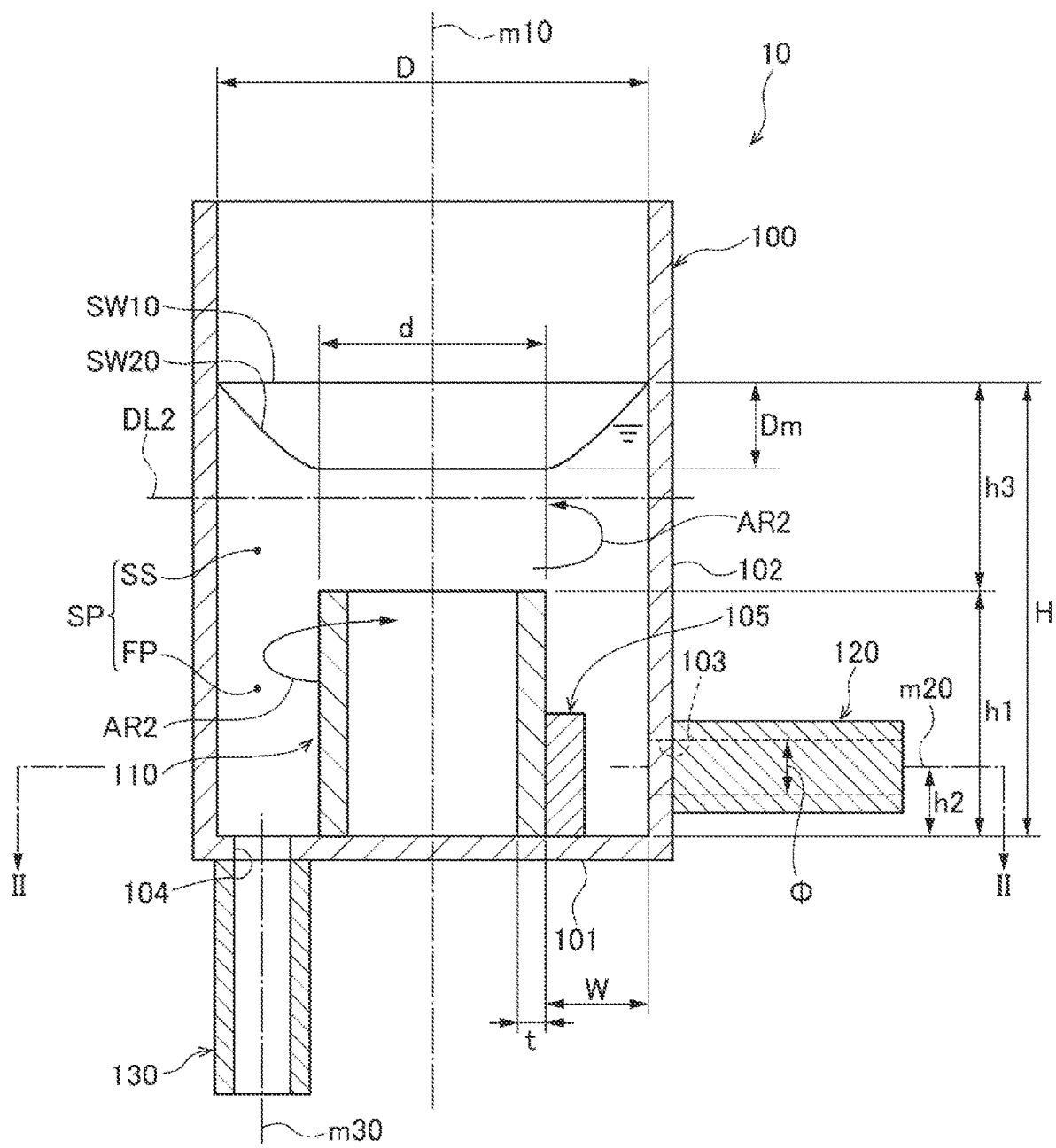
FIG. 1 is a cross-sectional view showing a structure of a reserve tank of a first embodiment.

A vehicle has a cooling system that is configured to cool each of corresponding components of the vehicle by circulating coolant. The components to be cooled by the cooling system include auxiliary devices, such as an engine and an intercooler. In addition to these devices to be cooled, a water pump, which pumps the coolant, a reserve tank, which stores a portion of the coolant, and the like are provided in a path, through which the coolant is circulated in the cooling system. When the amount of coolant is decreased for some reason, the coolant is replenished from the reserve tank. As a result, it is possible to limit a deterioration in the cooling performance caused by the decrease in the amount of coolant. As such a reserve tank, for example, there has been proposed the following reserve tank.

That is, the previously proposed reserve tank has a gas-liquid separation chamber that is a space for separating air bubbles from the coolant. The gas-liquid separation chamber is a space shaped generally in a cylindrical form. A lower portion of the gas-liquid separation chamber has a flow inlet opening of the coolant and a flow outlet opening of the coolant. The coolant, which flows into the gas-liquid separation chamber through the flow inlet opening, flows upward while swirling in the gas-liquid separation chamber. As a result, because of the swirling flow, not only large air bubbles but also air bubbles with low buoyancy rise and reach a top surface of the coolant where the air bubbles disappear. Moreover, since both the flow inlet opening and the flow outlet opening are provided below the top surface of the coolant, it is possible to limit the generation of new air bubbles in response to the inflow of the coolant.

In the previously proposed reserve tank, when a flow velocity of the coolant, which enters the gas-liquid separation chamber, is slow, there is a possibility that the coolant does not sufficiently swirl at the inside of the gas-liquid separation chamber. If a sufficient swirling flow of the coolant is not formed at the inside of the gas-liquid separation chamber, the function of separating the coolant and the air bubbles may possibly be deteriorated. Furthermore, if the flow of the coolant is disturbed due to the insufficient swirling flow, there is a concern that new air bubbles may be generated at the inside of the gas-liquid separation chamber. Thus, the previously proposed reserve tank leaves room for improvement with respect to the generation and removal of the air bubbles.

A reserve tank according to one aspect of the present disclosure includes a gas-liquid separator, a flow inlet portion, a flow outlet portion, and a projection shaped in a tubular form. The gas-liquid separator is shaped in a bottomed tubular form and is centered on a predetermined axis. The flow inlet portion is formed at the gas-liquid separator and is configured to conduct coolant into an inside of the gas-liquid separator. The flow outlet portion is formed at the gas-liquid separator and is configured to discharge the coolant from the inside of the gas-liquid separator. The projection extends along the predetermined axis from a bottom wall at the inside of the gas-liquid separator. An annular flow passage is formed by a gap which is formed between an inner peripheral surface of the gas-liquid separator and an outer peripheral surface of the projection. An opening, which is formed at an inner surface of the gas-liquid separator and is communicated with the flow inlet portion, is defined as a flow inlet opening, and an opening, which is formed at the inner surface of the gas-liquid separator and is communicated with the flow outlet portion, is defined as a flow outlet opening. In an axial direction of the predetermined axis, the flow outlet opening is located on a bottom side of the flow inlet opening where the bottom wall of the gas-liquid separator is placed. In the axial direction of the predetermined axis, the flow inlet opening is located on the bottom side of a distal end portion of the projection where the bottom wall of the gas-liquid separator is placed. An inner space of the projection opens to an inner space of the gas-liquid separator at the distal end portion of the projection.

With the above-described configuration, the coolant, which flows from the flow inlet opening into the annular flow passage, swirls along the annular flow passage. Therefore, a swirling flow of the coolant is formed at the inside of the gas-liquid separator. As a result, the swirling coolant flows outward due to the centrifugal force. Also, since the air bubbles, which are contained in the coolant, are lighter than the coolant, the air bubbles are collected near the center of the swirling flow of the coolant. When the air bubbles, which are collected near the center of the swirling flow of the coolant, reach a top surface of the coolant, the air bubbles are collected in an upper space of the gas-liquid separator. Through this process, the air bubbles contained in the coolant can be removed.

Furthermore, the inventors of the present application have confirmed through an experiment that in the case where the projection is formed at the inside of the gas-liquid separator, a flow velocity range, in which the swirl flow of the coolant is stabilized without causing turbulence in the flow of the coolant, is widened as compared with the case where the projection is not formed.

Furthermore, the coolant is stagnated at the inside of the projection. The stagnated portion of the coolant acts to attenuate the swirling flow of the coolant formed at the inside of the gas-liquid separator. Therefore, an excessive increase in the flow velocity of the swirling flow of the coolant is limited, and thereby the swirling flow of the coolant can be stabilized. As a result, generation of air bubbles in the coolant can be limited.

As described above, with the above configuration, it is possible to stably exhibit both of the function of limiting the generation of the air bubbles and the function of removing the air bubbles.

Hereinafter, embodiments of a reserve tank will be described with reference to the drawings. In order to facilitate understanding of the description, the same components are indicated by the same reference signs as much as possible in each drawing, and redundant descriptions are omitted.

First Embodiment

First of all, a reserve tank 10 of a first embodiment will be described with reference to FIGS. 1 and 2. The reserve tank 10 is used in a cooling system installed in a vehicle. The cooling system is a system that is configured to cool various components of the vehicle, specifically, an internal combustion engine and accessories by circulating coolant therethrough. In the cooling system, the coolant, which is pumped by a water pump, is supplied to the cooling subjects, such as the internal combustion engine, to cool the cooling subjects. The coolant, which has passed through the cooling subjects and has reached a high temperature, is cooled at a radiator and is returned to the water pump, and thereafter the coolant is pumped once again from the water pump. Since a well-known structure can be adopted as a structure of such a cooling system, specific illustration and description thereof will be omitted.

The reserve tank 10 is installed in such a cooling system at a location in the middle of a path, through which the coolant is circulated, such as a location on an upstream side of the water pump. It should be noted that "in the middle of the path through which the coolant is circulated" does not have to be in the middle of the path through which the coolant always flows but can be in the middle of the path where the coolant temporarily flows, for example, in a bypass flow passage.

Figure 2:
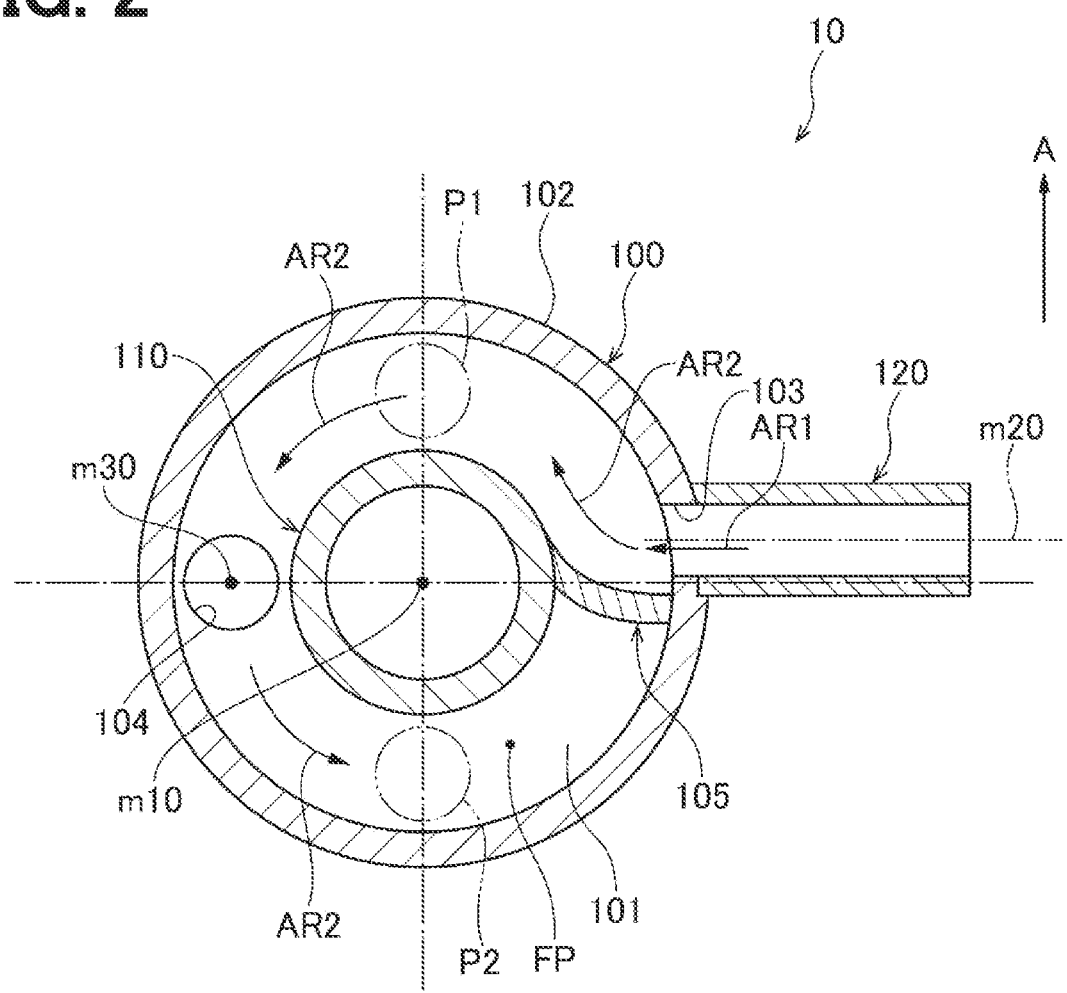
FIG. 2 is a cross-sectional taken along line II-II in FIG. 1.

As shown in FIGS. 1 and 2, the reserve tank 10 includes a gas-liquid separator 100, a flow inlet portion 120 and a flow outlet portion 130.

The gas-liquid separator 100 is a vessel for removing air bubbles contained in the coolant while temporarily storing the supplied coolant. The gas-liquid separator 100 is shaped in a bottomed cylindrical tubular form and is centered on a predetermined first axis (also referred to as a central axis) m10. The gas-liquid separator 100 is placed such that the central axis m10 of the gas-liquid separator 100 is parallel with the direction of gravity.

An inner space SP is formed at an inside of the gas-liquid separator 100. The inner space SP is a space for temporarily storing the coolant and also for separating a gas phase and a liquid phase of the coolant to remove the air bubbles.

An upper end opening of the gas-liquid separator 100 is closed with a cap (not shown). A valve is installed to the cap. During the normal time when the pressure in the inner space SP is low, the valve of the cap is closed, and thereby the inner space SP is cut off from the outside air. When the pressure in the inner space SP is increased and exceeds a predetermined value, the valve of the cap is opened to allow the air in the inner space SP to escape to the outside.

A projection 110 is formed at the inside of the gas-liquid separator 100. The projection 110 is shaped in a cylindrical tubular form and extends along the first axis m10 from a bottom wall 101 at the inside of the gas-liquid separator 100. The gas-liquid separator 100 and the projection 110 are arranged concentrically about the first axis m10. Here, an outer diameter of the projection 110 is denoted by d, and an inner diameter of the gas-liquid separator 100 is denoted by D. In such a case, there is established a relationship of D>d. An opening at the distal end portion of the projection 110 opens to the inner space SP of the gas-liquid separator 100.

A gap, which is formed between an inner peripheral surface of a peripheral wall 102 of the gas-liquid separator 100 and an outer peripheral surface of the projection 110, forms a flow passage FP, which is shaped in an annular form and is centered on the first axis m10. Hereinafter, this flow passage FP will be referred to as an annular flow passage FP.

A dot-dot-dash line DL2 shown in FIG. 1 is a line that indicates a lower limit coolant level (i.e., a lower limit level of the coolant) in the gas-liquid separator 100. At the time of supplying the coolant into the reserve tank 10, the coolant supply amount (i.e., the supply amount of the coolant) is adjusted such that the level of the coolant is kept to be equal to or higher than the lower limit coolant level. The distal end portion of the projection 110 is placed at a position that is lower than the lower limit coolant level indicated with the dot-dot-dash line DL2. Therefore, the distal end portion (upper end portion) of the projection 110 does not protrude above the surface of the coolant. As described above, the coolant is stored in the inner space SP of the gas-liquid separator 100 up to a portion located above the projection 110. In the following description, the portion of the inner space SP of the gas-liquid separator 100, which is located above the projection 110, will be referred to as a storage portion SS.

The flow inlet portion 120 is a portion which conducts the coolant circulated in the cooling system into the inside of the gas-liquid separator 100. As shown in FIG. 2, a flow inlet opening 103 extends through the peripheral wall 102 of the gas-liquid separator 100 from an inner surface to an outer surface of the peripheral wall 102. The flow inlet opening 103 is an opening, which opens at the inner surface of the gas-liquid separator 100 and is communicated with the flow inlet portion 120. The flow inlet portion 120 is shaped in a tubular form and is centered on a second axis (also referred to as a central axis) m20 which is perpendicular to the first axis m10. The flow inlet portion 120 extends from the flow inlet opening 103 toward the outer side (radially outer side) of the gas-liquid separator 100. The central axis m20 of the flow inlet portion 120 is offset relative to the first axis m10 in a direction of an arrow A. The direction of the arrow A is a direction that is perpendicular to both of the first axis m10 and the second axis m20.

As shown in FIG. 1, in an axial direction of the first axis m10, the flow inlet opening 103 is located on a bottom side of the distal end portion of the projection 110 where a bottom wall 101 of the gas-liquid separator 100 is placed. Here, a distance, which is measured from an inner surface of the bottom wall 101 of the gas-liquid separator 100 to the distal end portion (distal end) of the projection 110 in the axial direction of the first axis m10, is denoted by h1, and a distance, which is measured from the inner surface of the bottom wall 101 of the gas-liquid separator 100 to the central axis m20 of the flow inlet portion 120 in the axial direction of the first axis m10, is denoted by h2. In such a case, there is established a relationship of h1>h2.

As shown in FIG. 2, since the central axis m20 of the flow inlet portion 120 is offset relative to the central axis m10 of the gas-liquid separator 100 in the direction of the arrow A, the coolant, which is supplied from the flow inlet portion 120 into the inside of the gas-liquid separator 100 through the flow inlet opening 103, flows as indicated by an arrow AR2. Specifically, the coolant, which is supplied from the flow inlet opening 103 into the inside of the gas-liquid separator 100, flows in the direction of the arrow AR2 along an outer wall of the projection 110. Therefore, there is likely to be generated a flow of the coolant that swirls in a counterclockwise direction about the first axis m10.

As shown in FIG. 2, a partition wall 105 is formed at the bottom wall 101 of the gas-liquid separator 100 such that the partition wall 105 partitions a portion of the annular flow passage FP. In the annular flow passage FP, the partition wall 105 is located on an upstream side of flow inlet opening 103 in a swirling direction of the coolant in the annular flow passage FP. As shown in FIG. 1, a location of an upper wall surface of the partition wall 105 is lower than a location of the distal end portion of the projection 110 in the axial direction of the first axis m10. As shown in FIG. 2, the partition wall 105 is provided to limit interference between: the flow of the coolant, which flows in a direction of an arrow AR1 from the flow inlet portion 120 into the inside of the gas-liquid separator 100; and the flow of the coolant, which swirls in the direction of the arrow AR2 at the inside of the gas-liquid separator 100.

The flow outlet portion 130 indicated in FIG. 1 is a portion, through which the coolant is discharged from the inside to the outside of the gas-liquid separator 100. In the gas-liquid separator 100, a flow outlet opening 104 extends through a portion of the bottom wall 101, which forms an inner wall of the annular flow passage FP, from an inner surface to an outer surface of the portion of the bottom wall 101. The flow outlet opening 104 is an opening, which opens at the inner surface of the gas-liquid separator 100 and is communicated with the flow outlet portion 130. In the axial direction of the first axis m10, the flow outlet opening 104 is located on the bottom side of the flow inlet opening 103 where the bottom wall 101 of the gas-liquid separator 100 is placed. The flow outlet portion 130 extends from the flow outlet opening 104 toward the lower side of the gas-liquid separator 100. The flow outlet portion 130 is shaped in a cylindrical tubular form and is centered on a third axis m30.

Next, an exemplary operation of the reserve tank 10 of the present embodiment will be described.

As shown in FIG. 2, in the reserve tank 10, the coolant, which is supplied into the flow inlet portion 120, flows into the inside of the gas-liquid separator 100 through the flow inlet opening 103, as indicated by the arrow AR1. The coolant, which is supplied into the inside of the gas-liquid separator 100, flows along the annular flow passage FP and thereby forms a swirling flow indicated by the arrow AR2. The coolant, which has become the swirling flow, flows upward at the inside the gas-liquid separator 100. Therefore, a vortex of the coolant shown in FIG. 1 is formed at the storage portion SS of the gas-liquid separator 100. Furthermore, a portion of the coolant, which flows at the inside of the gas-liquid separator 100, is discharged to the outside of the gas-liquid separator 100 through the flow outlet portion 130.

When the vortex of the coolant shown in FIG. 1 is generated in the storage portion SS, the coolant in the storage portion SS flows radially outward due to the centrifugal force, i.e., flows toward the inner peripheral surface of the peripheral wall 102 of the gas-liquid separator 100, while the air bubbles contained in the coolant are collected around the center of the swirling flow of the coolant since the air bubbles are lighter than the coolant. These air bubbles reach a top surface SW10 of the coolant and are thereby collected in an upper space of the gas-liquid separator 100. Through this process, the air bubbles contained in the coolant can be removed.

Here, a distance, which is measured from the inner surface of the bottom wall 101 of the gas-liquid separator 100 to the top surface SW10 of the coolant in the axial direction of the first axis m10, is denoted by H, and the distance, which is measured from the inner surface of the bottom wall 101 of the gas-liquid separator 100 to the distal end portion of the projection 110 in the axial direction of the first axis m10, is denoted by h1. In such a case, there is established a relationship of H>h1.

Furthermore, the inventors of the present application have confirmed through an experiment that in the case where the projection 110 is formed at the inside of the gas-liquid separator 100, a flow velocity range, in which the swirl flow of the coolant is stabilized without causing turbulence in the flow of the coolant, is widened as compared with the case where the projection 110 is not formed.

Furthermore, the coolant exists at the inside of the projection 110. The coolant, which exists at the inside of the projection 110, is stagnated at the inside of the projection 110 without being affected by the swirling flow formed in the storage portion SS. Since the coolant in the storage portion SS is pulled and is thereby circulated in the circumferential direction under the influence of the flow of the coolant generated at the inside of the gas-liquid separator 100, the coolant in the storage portion SS is swirled in the circumferential direction along the inner peripheral surface of the peripheral wall 102 of the gas-liquid separator 100. In contrast, the coolant, which is stagnated at the inside of the projection 110, acts to attenuate the flow velocity near the center of the swirling flow of the coolant which flows in the storage portion SS. Therefore, as shown in FIG. 1, an interface SW20 of the swirling flow, which is generated at the top surface SW10 of the coolant, becomes a shallow dish form, a center of which is planar. Thus, even if the swirling flow velocity of the coolant, which flows in the annular flow passage FP, is increased due to an increase in a flow rate of the coolant supplied from the flow inlet portion 120 into the gas-liquid separator 100, an increase in the swirling flow velocity of the coolant at the inside of the storage portion SS is limited. As a result, the swirling flow of the coolant can be stabilized, so that it is possible to limit the phenomenon that the coolant entrains the air due to waving of the interface SW20 of the swirling flow. Therefore, it is possible to limit the generation of new air bubbles in the coolant.

In contrast, when the swirling flow velocity of the coolant in the storage portion SS is increased, the bottom of the interface SW20 of the swirling flow, which is now mortar-shaped, gets deeper. Therefore, in such a case, the interface SW20 of the mortar-shaped swirling flow may possibly contact the distal end portion of the projection 110. If the interface SW20 of the swirling flow comes in contact with the distal end portion of the projection 110, the interface SW20 of the swirling flow would be disturbed and the air may possibly be entrained by the coolant. With respect to this point, in the reserve tank 10 of the present embodiment, the coolant, which is stagnated at the inside of the projection 110, can limit an increase in the swirling flow velocity of the coolant in the storage portion SS, and thereby the swirling flow of the coolant can be stabilized. As a result, since the interface SW20 of the swirling flow is less likely to come in contact with the distal end portion of the projection 110, it is possible to limit the generation of the air bubbles which would be caused by the disturbance of the interface SW20 of the swirling flow.

According to the reserve tank 10 of the present embodiment described above, the actions and advantages indicated at the following sections (1) to (4) can be achieved.

(1) According to the reserve tank 10 of the present embodiment, the swirling flow of the coolant is formed at the inside of the gas-liquid separator 100, so that the air bubbles contained in the coolant can be removed. Furthermore, the coolant, which is stagnated at the inside of the projection 110, can limit the increase in the swirling flow velocity of the coolant. Therefore, the swirling flow of the coolant can be stabilized, and thereby the generation of new air bubbles in the coolant can be limited. As described above, according to the reserve tank 10 of the present embodiment, it is possible to stably exhibit both the function of limiting the generation of the air bubbles and the function of removing the air bubbles.

(2) As shown in FIG. 2, the projection 110 is shaped in the tubular form and is centered on the first axis m10. The central axis m20 of the flow inlet portion 120 is offset relative to the first axis m10 in the direction of the arrow A. With this configuration, the coolant, which is supplied from the flow inlet portion 120 into the inside of the gas-liquid separator 100, is likely to form the swirling flow.

(3) As shown in FIG. 2, the partition wall 105 is provided on the upstream side of the flow inlet opening 103 in the flow direction AR2 of the coolant in the annular flow passage FP. With this structure, the interference between the coolant, which flows from the flow inlet opening 103 into the annular flow passage FP, and the coolant, which is circulated in the annular flow passage FP, can be limited by the partition wall 105. As a result, the swirling flow of the coolant can be easily formed.

Figure 3:
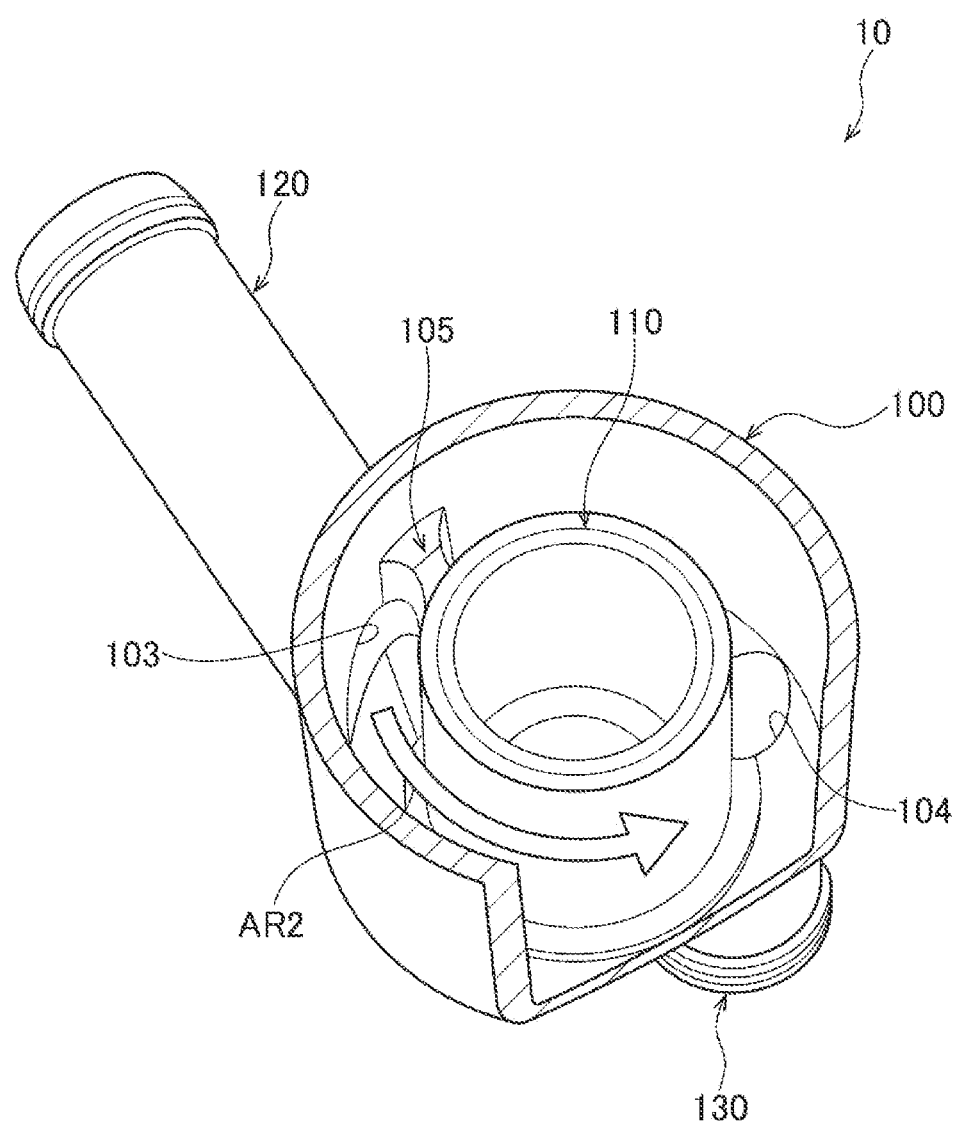
FIG. 3 is a perspective view showing a cross-section of the structure of the reserve tank of the first embodiment.

(4) In the gas-liquid separator 100, the flow outlet opening 104 is formed at the portion of the bottom wall 101 of the gas-liquid separator 100 while the portion of the bottom wall 101 forms the inner wall of the annular flow passage FP. With this configuration, the position of the flow outlet opening 104 can be changed to, for example, a position P1 or a position P2 indicated by a dot-dot-dash line in FIG. 2. Therefore, a degree of freedom in design can be improved. FIG. 3 is a perspective view showing a cross-section of the structure of the reserve tank 10 in the case where the flow outlet opening 104 is formed at the position P2.

Modification

Next, a modification of the reserve tank 10 of the first embodiment will be described.

Figure 4:
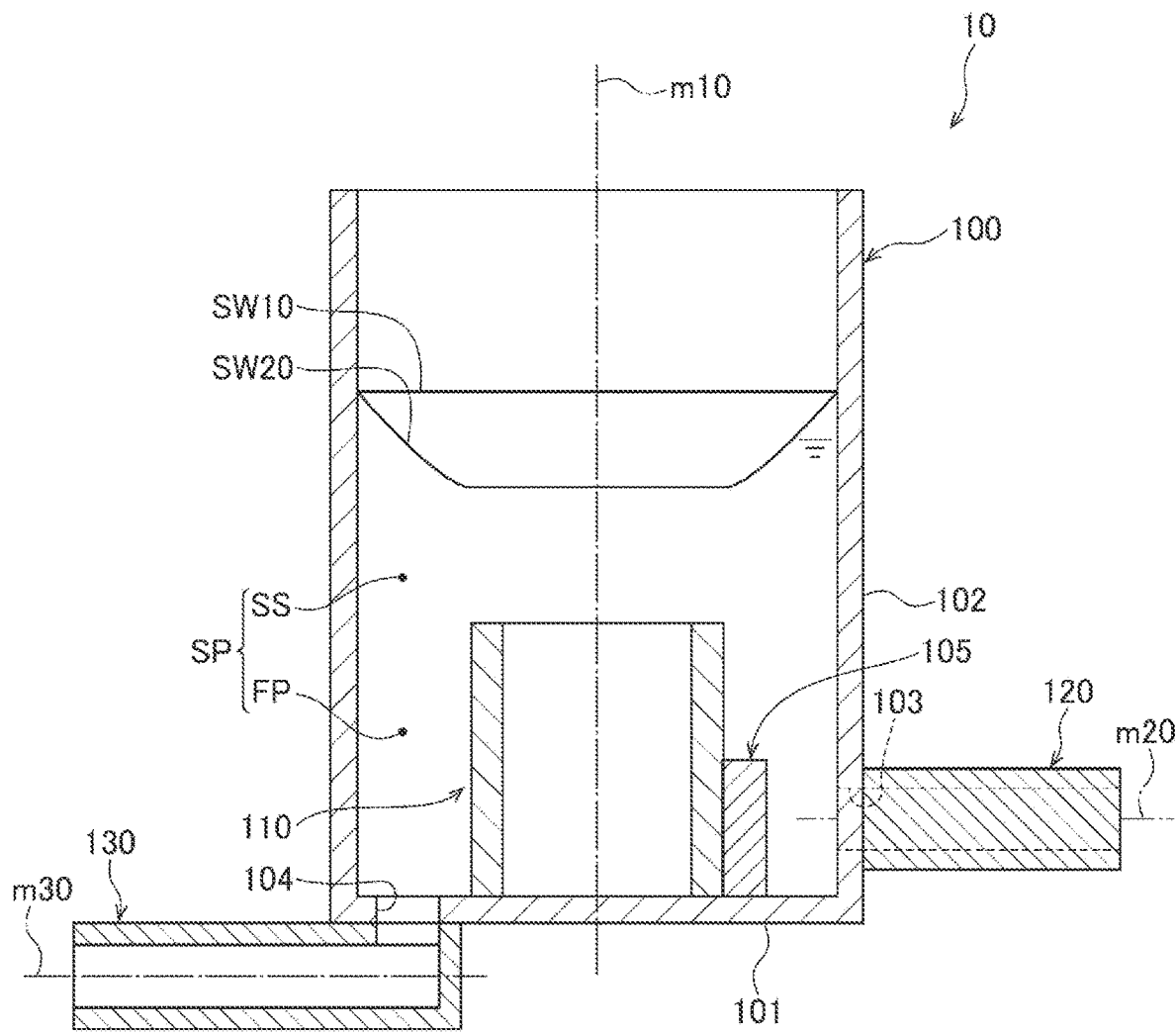
FIG. 4 is a cross-sectional view of a reserve tank of a modification of the first embodiment.

As shown in FIG. 4, in the reserve tank 10 of this modification, the flow outlet portion 130 is arranged to extend from the flow outlet opening 104 in a direction, which is perpendicular to the first axis m10 and is directed toward the outer side (radially outer side) of the gas-liquid separator 100. With this configuration, in comparison to the reserve tank 10 of the first embodiment, it is possible to avoid an increase in the size of the reserve tank 10 in the axial direction of the first axis m10.

Second Embodiment

Next, the reserve tank 10 of a second embodiment will be described. The following description focuses on the differences relative to the reserve tank 10 of the first embodiment.

Figure 5:
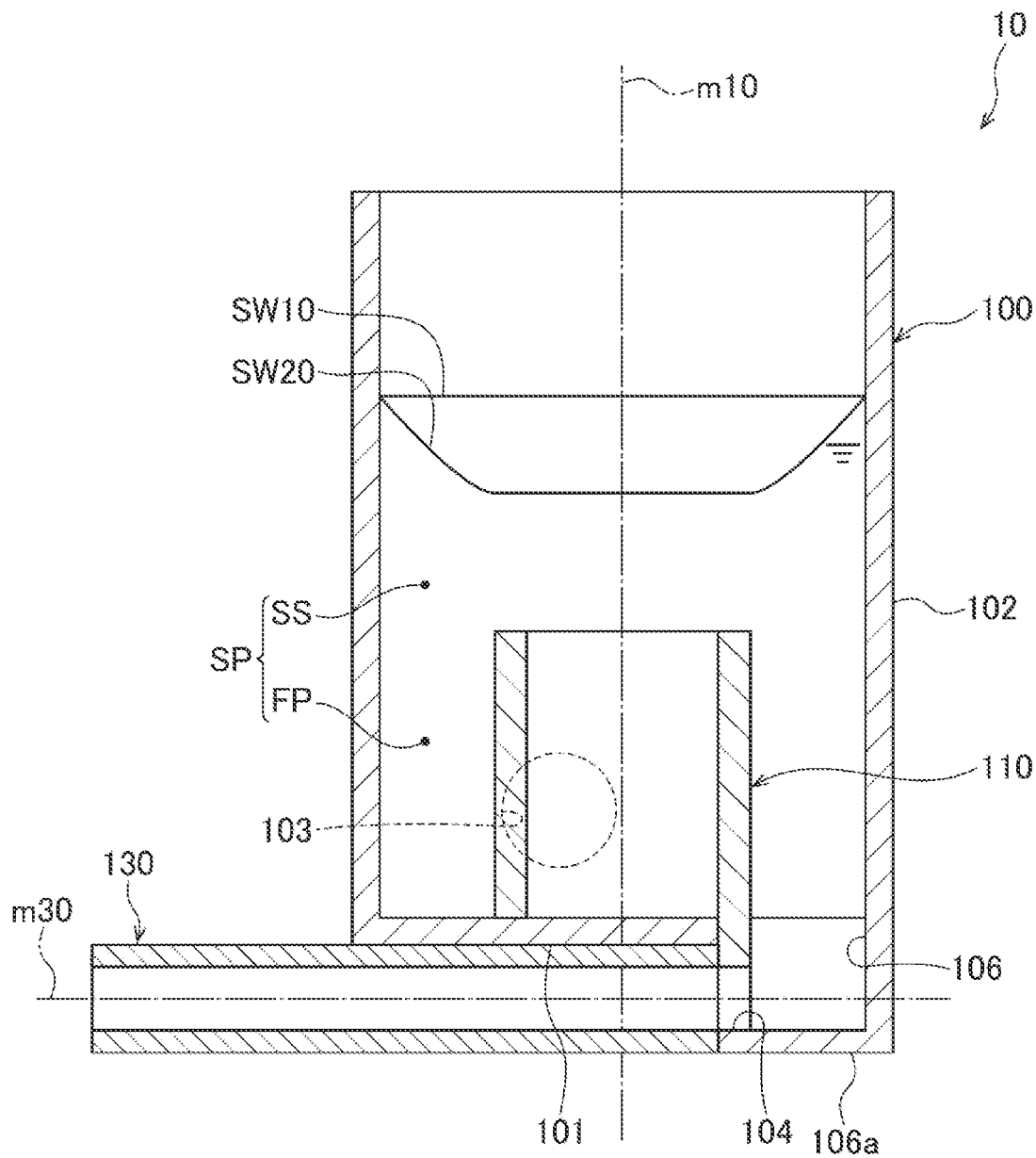
FIG. 5 is a cross-sectional view showing a structure of a reserve tank of a second embodiment.
Figure 6:
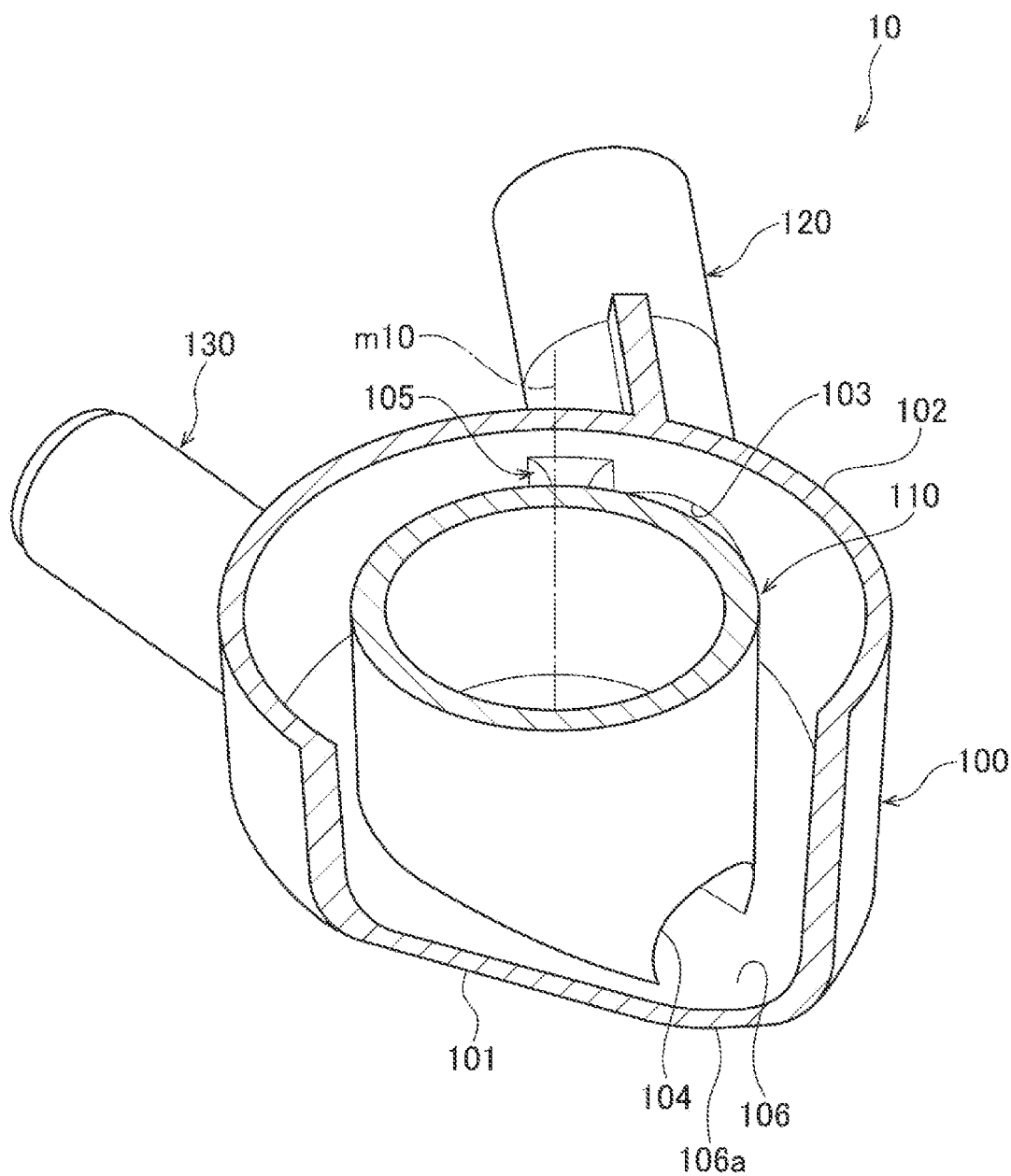
FIG. 6 is a perspective view showing a cross-section of the structure of the reserve tank of the second embodiment.

As shown in FIGS. 5 and 6, in the reserve tank 10 of the present embodiment, a recess 106 is formed at the portion of the bottom wall 101 of the gas-liquid separator 100, which forms the inner wall of the annular flow passage FP. A bottom portion 106a of the recess 106 is positioned such that the bottom portion 106a projects downward relative to the bottom wall 101 of the gas-liquid separator 100. The flow outlet opening 104 extends through a peripheral wall of the recess 106 from an inner surface to an outer surface of the peripheral wall of the recess 106. The flow outlet portion 130 is connected to the flow outlet opening 104. The flow outlet portion 130 extends from the flow outlet opening 104 along an outer surface of the bottom wall 101 of the gas-liquid separator 100.

According to the reserve tank 10 of the present embodiment described above, the following action and advantage recited at the following section (5) can be achieved in addition to the actions and advantages recited at the above sections (1) to (4).

(5) Since the flow outlet portion 130 can be arranged to extend along the outer surface of the bottom wall 101 of the gas-liquid separator 100, it is possible to avoid an increase in the size of the reserve tank 10 in the axial direction of the first axis m10 in comparison to the reserve tank 10 of the first embodiment.

Modification

Next, a modification of the reserve tank 10 of the second embodiment will be described.

Figure 7:
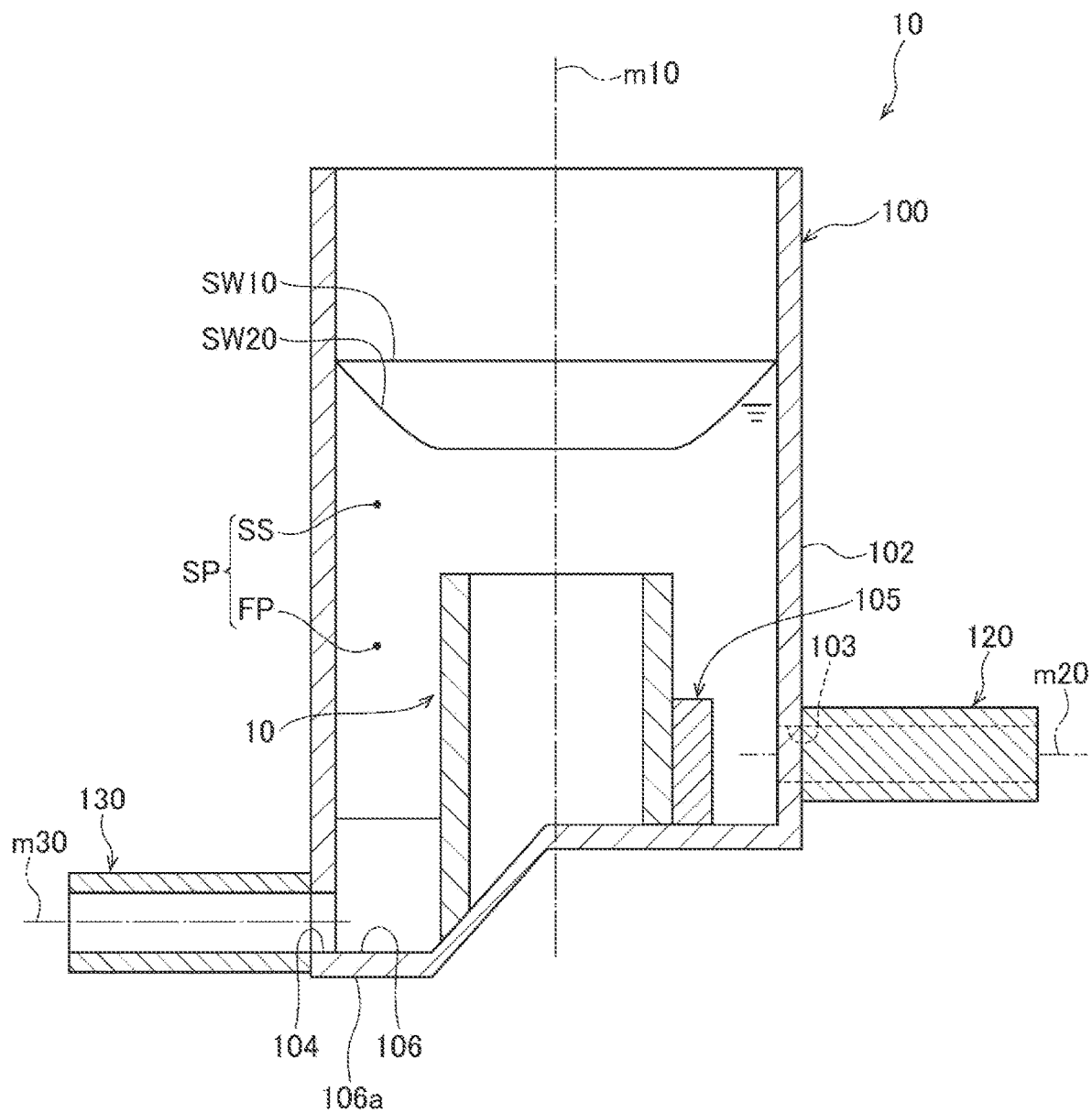
FIG. 7 is a cross-sectional view showing a structure of a reserve tank of a modification of the second embodiment.

As shown in FIG. 7, in the reserve tank 10 of the present modification, the flow outlet portion 130 extends from the flow outlet opening 104 in the direction, which is perpendicular to the first axis m10 and is directed toward the outer side (radially outer side) of the gas-liquid separator 100. With this configuration, the flow outlet portion 130 can be positioned at the location which is opposite to the flow inlet portion 120.

Third Embodiment

Next, the reserve tank 10 of a third embodiment will be described. The following description focuses on the differences relative to the reserve tank 10 of the first embodiment.

As shown in FIG. 1, in the reserve tank 10, the mortar-shaped swirling flow may be formed by swirling the coolant at the inside of the gas-liquid separator 100. A length, which is measured from the top surface SW10 of the coolant to a bottom surface of the mortar-shaped swirling flow, is defined as an interface depth Dm. It is known that when the interface depth Dm is increased, the air, which exists above the interface SW20, is likely to be caught in the swirling coolant. When such an air entrainment phenomenon occurs, there is a risk that the gas-liquid separating function of the reserve tank 10 cannot be ensured. In view of the above point, the inventors of the present application have conducted an experiment to determine a relationship between the interface depth Dm and the air bubble entrainment amount Ba.

Figure 8:
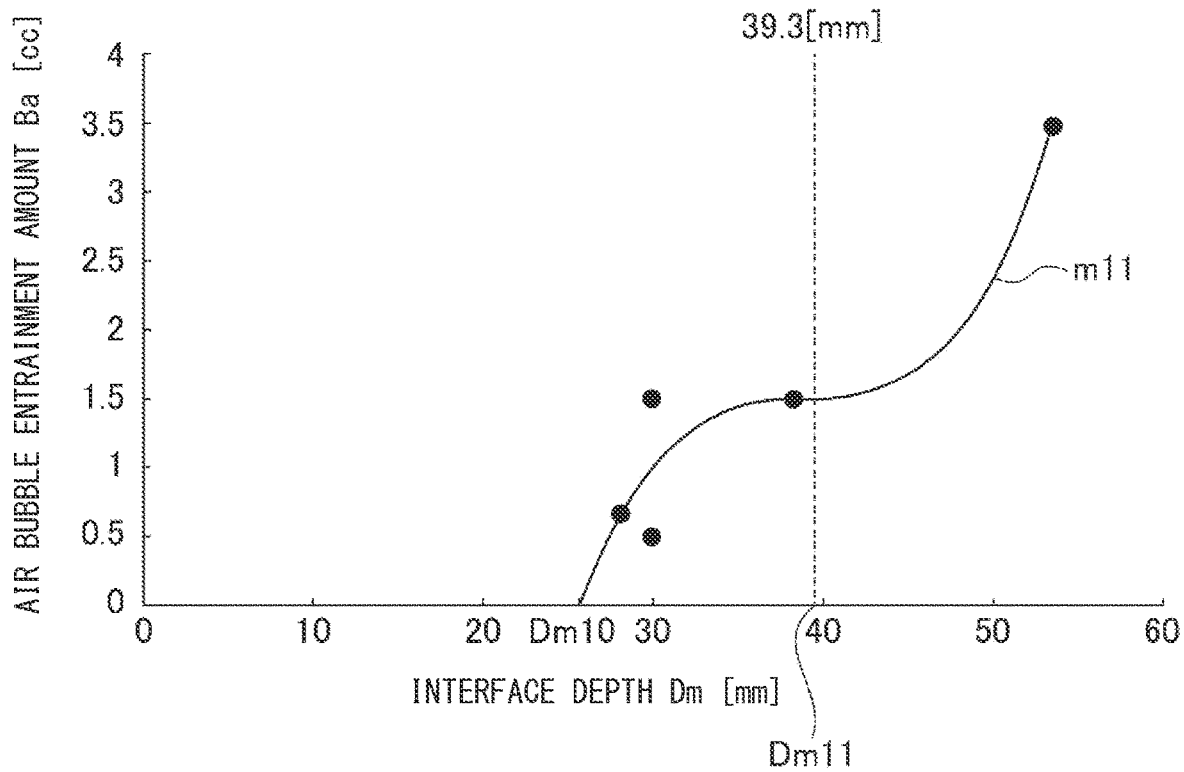
FIG. 8 is a graph showing a relationship between an interface depth Dm and an air bubble entrainment amount Ba of the reserve tank obtained by the inventors of the present application.

FIG. 8 shows the measurement results which are obtained through the experiment and are indicated by circle points. By obtaining an approximation equation, which indicates the relationship of all the points shown in FIG. 8, the following equation f1 can be obtained.

$$Ba = 0.0006 Dm^3 - 0.0707 Dm^2 + 2.7644 Dm - 34.612 \quad \text{(f1)}$$

A curved line m11, which is shown in FIG. 8, indicates this equation f1.

As shown in FIG. 8, when the interface depth Dm gradually increases and reaches a predetermined depth Dm10, the air bubble entrainment amount Ba becomes greater than zero. That is, the air bubble entrainment phenomenon occurs. In a region, in which the interface depth Dm satisfies the relationship of Dm10<Dm, when the interface depth Dm increases, the air bubble entrainment amount Ba is increased once and is saturated and is thereafter increased once again. Therefore, the air bubble entrainment amount Ba has an inflection point with respect to the change in the interface depth Dm. In FIG. 8, the interface depth Dm, which corresponds to the inflection point of the air bubble entrainment amount Ba, is indicated by Dm11. The reason why the air bubble entrainment amount Ba changes in this way is considered as follows.

First, when the interface depth Dm is increased, the interface SW20 of the coolant approaches the upper end surface of the projection 110. Therefore, the limiting effect, which is exerted by the coolant stagnated at the inside of the projection 110 and limits the swirling flow velocity, is reduced. As a result, the interface SW20 of the coolant becomes unstable. Therefore, there is likely to induce the air bubble entrainment phenomenon such that the air, which exists above the interface SW20, is entrained in the swirling coolant. As shown in FIG. 8, when the interface depth Dm reaches the predetermined depth Dm10, this air entrainment phenomenon occurs. Thus, the air bubble entrainment amount Ba begins to increase.

When the interface depth Dm is further increased, the amount of air, which is entrained in the swirling flow of the coolant, is increased. Thus, the air bubble entrainment amount Ba is increased. At this time, the air, which is entrained in the coolant, is agitated inside the swirling coolant to form minute air bubbles called microbubbles. Since the buoyancy of these minute air bubbles is small, the minute air bubbles stay in the coolant for a long time. Also, these minute air bubbles are combined to form large air bubbles. By becoming the large air bubbles, these large air bubbles gain a large buoyancy and float to be taken into the air layer above the top surface SW10 of the coolant. In the state where the microbubbles are formed, these microbubbles are combined to form the large air bubbles. Thereby, the coolant and the air can be separated from each other to ensure the gas-liquid separating function at the reserve tank 10.

On the other hand, there is a limit to the amount of air, which can be entrained in the coolant as the minute air bubbles. Because of this reason, when the interface depth Dm reaches the predetermined depth Dm11, the air bubble entrainment amount Ba is once saturated. In the experimental environment, the predetermined depth Dm11 is substantially equal to a coolant top surface height h3, which is a length measured from the upper end surface of the projection 110 to the top surface SW10 of the coolant shown in FIG. 1.

When the interface depth Dm is increased beyond the predetermined depth Dm11, the interface SW20 of the coolant becomes lower than the projection 110, that is, the interface SW20 of the coolant comes in contact with the projection 110. Therefore, it becomes difficult to rectify the flow of the coolant formed inside the gas-liquid separator 100. That is, since the interface SW20 of the coolant becomes extremely unstable, the coolant entrains the air, which exists above the interface SW20, not only in the form of microbubbles but also larger air bubbles. As a result, when the interface depth Dm becomes even deeper than the predetermined depth Dm11, the air bubble entrainment amount Ba is increased rapidly.

In view of that the interface depth Dm and the air bubble entrainment amount Ba have the relationship shown in FIG. 8, the gas-liquid separating function of the reserve tank 10 can be ensured as long as the interface depth Dm satisfies the relationship of Dm<Dm11. The interface depth Dm11, at which the inflection point of the air bubble entrainment amount Ba appears, is calculated to be 39.3 [mm] based on the above equation f1. Therefore, in order to ensure the gas-liquid separating function of the reserve tank 10, the interface depth Dm should satisfy the following equation f2.

$$Dm < 39.3 \text{ [mm]} \quad \text{(f2)}$$

Figure 9:
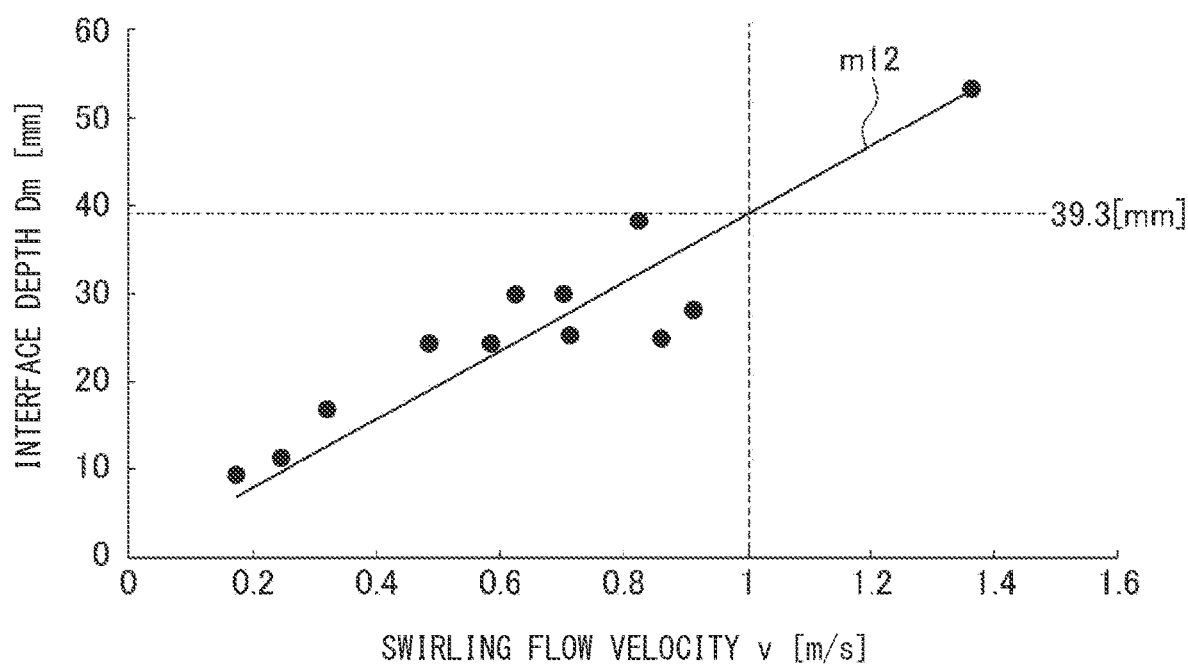
FIG. 9 is a graph showing a relationship between a swirling flow velocity v of the coolant and the interface depth Dm of the reserve tank obtained by the inventors.

On the other hand, the interface depth Dm depends on the swirling flow velocity of the coolant which swirls at the inside of the gas-liquid separator 100. Specifically, the interface depth Dm is increased when the swirling flow velocity of the coolant is increased. The inventors have obtained the relationship between the interface depth Dm and the swirling flow velocity v of the coolant by a simulation analysis. FIG. 9 shows the measurement results which are obtained through the simulation analysis and are indicated by circle points. By obtaining an approximation equation, which indicates the relationship of all the points shown in FIG. 9, the following equation f3 can be obtained.

$$Dm=39.223v \tag{f3}$$

A straight line m12, which is shown in FIG. 9, indicates this equation f3.

Here, by obtaining the swirling flow velocity v, which satisfies the above equation f2, based on the equation f3, the swirling flow velocity v, which can ensure the gas-liquid separating function of the reserve tank 10, can be obtained. Specifically, the swirling flow velocity v should satisfy the following equation f4.

$$v<1.0 \text{ [m/s]} \tag{f4}$$

Next, the inventors have determined the shape of the gas-liquid separator 100 that can satisfy the equation f4. Specifically, it is as follows.

As shown in FIG. 1, the coolant, which has entered the inside of the gas-liquid separator 100 from the flow inlet portion 120, flows while swirling in the gap between the inner peripheral surface of the gas-liquid separator 100 and the outer peripheral surface of the projection 110. Therefore, it is assumed that a width W of the gap, which is formed between the gas-liquid separator 100 and the projection 110, has an influence on the swirling flow velocity of the coolant. Therefore, the inventors have conducted a simulation analysis for a relationship between the width W of the gap, which is formed between the gas-liquid separator 100 and the projection 110, and the swirling flow velocity v of the coolant at the inside of the gas-liquid separator 100. Hereinafter, the width W of the gap will be referred to as a flow passage width W. The flow passage width W has a relationship of W=(D−d)/2 with respect to the inner diameter D of the gas-liquid separator 100 and the outer diameter d of the projection 110.

Specifically, the inventors have obtained the swirling flow velocity v by the simulation analysis at the time of changing the flow passage width W in a case where the inner diameter D of the gas-liquid separator 100 is 45 [mm]. In addition, the inventors have also obtained the relationship between the flow passage width W and the swirling flow velocity v by the simulation analysis for the case where the inner diameter D of the gas-liquid separator 100 is 55 [mm] and also the case where the inner diameter D of the gas-liquid separator 100 is 65 [mm].

In the simulation analysis, with respect to FIG. 1, the height h1 of the projection 110 is set to be 30 [mm], and a wall thickness t of the projection 110 is set to be 2.5 [mm], and an inner diameter φ of the flow inlet portion 120 is set to be 10 [mm]. Further, the coolant, which swirls at the inside of the gas-liquid separator 100 and is used in this simulation analysis, is a long life coolant (LLC) having a concentration of 50%. Physical property values of this coolant are set such that a viscosity is set to be 0.00137 [kg/m s], and a density is set to be 1053.62 [kg/m³], and a temperature is set to be 60 [° C.]. When the swirling flow of the coolant is formed at the inside of the gas-liquid separator 100 by the simulation analysis under these conditions, the distance H shown in FIG. 1 is about 70 [mm].

Figure 10:
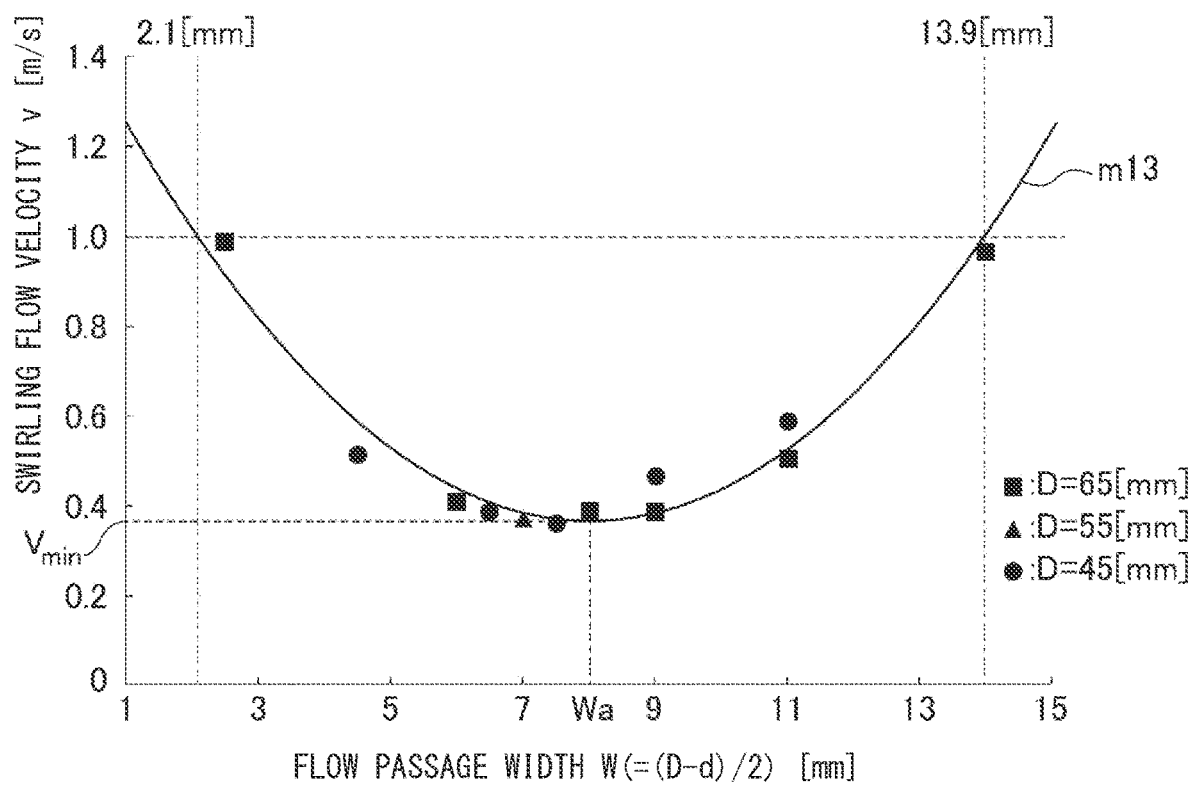
FIG. 10 is a graph showing a relationship between a flow passage width W and the swirling flow velocity v of the reserve tank obtained by the inventors.

FIG. 10 is a graph of the results of the simulation analysis performed by the inventors. In FIG. 10, the experimental results in the case, in which the inner diameter D of the gas-liquid separator 100 is set to be 45 [mm], are indicated by circle points, and the experimental results in the case, in which the inner diameter D of the gas-liquid separator 100 is set to be 55 [mm], are indicated by triangle points, and the experimental results in the case, in which the inner diameter D of the gas-liquid separator 100 is set to be 65 [mm], are indicated by square points.

As shown in FIG. 10, regardless of the size of the inner diameter D of the gas-liquid separator 100, the flow passage width W and the swirling flow velocity v have a similar correlation among these cases. By obtaining an approximation equation, which indicates the relationship of all the points shown in FIG. 10, the following equation f5 can be obtained.

$$v=0.0179W^2-0.2881W+1.5272 \tag{f5}$$

A curved line m13, which is shown in FIG. 10, indicates this equation f5.

As indicated by the equation f5, the swirling flow velocity v changes quadratically with respect to the flow passage width W. The flow passage width W, which makes the swirling flow velocity v to be a minimum value $v_{min}$, is defined as a flow passage width Wa. In a case where the Wa satisfies a relationship of W<Wa, when the flow passage width W is decreased, the swirling flow velocity v is increased. Thus, the interface SW20 of the swirling flow is likely to become unstable. When the flow passage width W satisfies a relationship of W=Wa, the swirling flow velocity v becomes the minimum value $v_{min}$. Thus, the interface SW20 of the swirling flow becomes most stable. Furthermore, in the case where the flow passage width W satisfies the relationship of Wa<W, when the flow passage width W is increased, the limiting effect, which is exerted by the coolant stagnated at the inside of the projection 110 and limits the swirling flow velocity, becomes relatively small. Thus, the interface SW20 of the swirling flow is likely to become unstable.

By using the above equation f5, the flow passage width W, which satisfies the above formula f4, can be obtained by the following equation f6. A dotted line, which is shown in FIG. 10, indicates the above equation f4.

$$1>0.0179W^2-0.2881W+1.5272 \tag{f6}$$

The flow passage width W, which satisfies this equation f6, is as indicated by the following equation f7.

$$2.1 \text{ [mm]}<W(=(D-d)/2)<13.9 \text{ [mm]} \tag{f7}$$

Therefore, by setting the inner diameter D of the gas-liquid separator 100 and the outer diameter d of the projection 110 so as to satisfy the equation f7, the gas-liquid separating function of the reserve tank 10 can be ensured.

OTHER EMBODIMENTS

The above embodiments may be modified as follows.

The partition wall 105 may be eliminated from the gas-liquid separator 100 in each of the above embodiments.

The storage portion SS of the gas-liquid separator 100 is not limited to the shape having the constant diameter in the axial direction of the first axis m10. That is, the storage portion SS of the gas-liquid separator 100 may have a shape in which the diameter changes in the axial direction of the first axis m10.

The shape of the portion of the gas-liquid separator 100, which is located above the top surface SW10 of the coolant, is not limited to the cylindrical tubular form centered on the first axis m10. That is, this portion of the gas-liquid separator 100 may be shaped in another form, such as a rectangular tubular form.

The present disclosure is not limited to the above specific examples. Appropriate design changes made by those skilled in the art to the above specific examples are also included in the scope of the present disclosure as long as they have the features of the present disclosure. Each element included in each specific example described above, and its arrangement, conditions, shape, etc., are not limited to those illustrated and can be changed as appropriate. As long as there is no technical contradiction, the combination of the elements included in the specific examples described above can be changed as appropriate.

What is claimed is:

1. A reserve tank comprising:
   a gas-liquid separator that is shaped in a bottomed tubular form and is centered on a predetermined axis;
   a flow inlet portion that is formed at the gas-liquid separator and is configured to conduct coolant into an inside of the gas-liquid separator;
   a flow outlet portion that is formed at the gas-liquid separator and is configured to discharge the coolant from the inside of the gas-liquid separator; and
   a projection that is shaped in a tubular form and extends along the predetermined axis from a bottom wall at the inside of the gas-liquid separator, wherein:
   an annular flow passage is formed by a gap which is formed between an inner peripheral surface of the gas-liquid separator and an outer peripheral surface of the projection;
   an opening, which is formed at an inner surface of the gas-liquid separator and is communicated with the flow inlet portion, is defined as a flow inlet opening, and an opening, which is formed at the inner surface of the gas-liquid separator and is communicated with the flow outlet portion, is defined as a flow outlet opening;
   in an axial direction of the predetermined axis, the flow outlet opening is located on a bottom side of the flow inlet opening where the bottom wall of the gas-liquid separator is placed;
   in the axial direction of the predetermined axis, the flow inlet opening is located on the bottom side of a distal end portion of the projection where the bottom wall of the gas-liquid separator is placed;
   an inner space of the projection opens to an inner space of the gas-liquid separator at the distal end portion of the projection;
   a peripheral wall surface and a bottom of the projection, which are other than a distal end opening of the projection, are closed;
   the predetermined axis is defined as a first axis;
   the flow inlet portion is shaped in a tubular form and is centered on a second axis, which is perpendicular to the first axis; and
   the second axis is offset relative to the first axis in a direction which is perpendicular to both of the first axis and the second axis to form a swirl flow along an outer wall of the projection in the annular flow passage with the coolant discharged from the flow inlet opening of the flow inlet portion into the annular flow passage.

2. The reserve tank according to claim 1, wherein a partition wall is formed at a portion of the annular flow passage, which is located on an upstream side of the flow inlet opening in a flow direction of the coolant that is swirled in the annular flow passage, to partition the annular flow passage.

3. The reserve tank according to claim 1, wherein:
   a recess is formed at the bottom wall of the gas-liquid separator; and
   the flow outlet portion is formed to extend from the recess.

4. The reserve tank according to claim 3, wherein the flow outlet portion is formed to extend from the recess along an outer surface of the bottom wall of the gas-liquid separator.

5. The reserve tank according to claim 3, wherein the flow outlet portion is formed to extend from the recess toward an outer side of the gas-liquid separator.

6. The reserve tank according to claim 1, wherein the flow outlet opening is formed at a portion of the bottom wall of the gas-liquid separator while the portion of the bottom wall forms an inner wall of the annular flow passage.

7. The reserve tank according to claim 1, wherein:
   an inner diameter of the gas-liquid separator and an outer diameter of the projection satisfy the following equation:

$(D-d)/2 < 13.9$ [mm], where D denotes the inner diameter of the gas-liquid separator, and d denotes the outer diameter of the projection.

8. The reserve tank according to claim 7, wherein:
   the inner diameter of the gas-liquid separator and the outer diameter of the projection satisfy the following equation:

$2.1$ [mm] $< (D-d)/2$, where D denotes the inner diameter of the gas-liquid separator, and d denotes the outer diameter of the projection.

9. The reserve tank according to claim 1, wherein an outer diameter of the projection is larger than a passage width of the annular flow passage which is measured in a radial direction of the predetermined axis.

* * * * *